US008725653B1

(12) United States Patent
Hernandez et al.

(10) Patent No.: US 8,725,653 B1
(45) Date of Patent: May 13, 2014

(54) DARE CAMPAIGN PLATFORM

(71) Applicant: Darelicious Inc., Los Angeles, CA (US)

(72) Inventors: Jorge Hernandez, West Hollywood, CA (US); Jason Palmer, Austin, TX (US)

(73) Assignee: Darelicious Inc., Los Angeles, CA (US)

( * ) Notice: Subject to any disclaimer, the term of this patent is extended or adjusted under 35 U.S.C. 154(b) by 0 days.

(21) Appl. No.: 13/951,850

(22) Filed: Jul. 26, 2013

(51) Int. Cl.
*G06Q 99/00* (2006.01)
*G06Q 50/00* (2012.01)

(52) U.S. Cl.
CPC .................... *G06Q 50/01* (2013.01)
USPC ........................... 705/319; 705/12

(58) Field of Classification Search
USPC .................................. 705/12, 319
See application file for complete search history.

(56) References Cited

U.S. PATENT DOCUMENTS

| | | | |
|---|---|---|---|
| 2004/0225518 A1* | 11/2004 | Bain | 705/1 |
| 2008/0221961 A1* | 9/2008 | James | 705/8 |
| 2008/0288277 A1* | 11/2008 | Fasciano | 705/1 |
| 2011/0246279 A1* | 10/2011 | Joa et al. | 705/14.25 |

* cited by examiner

*Primary Examiner* — James D Nigh
(74) *Attorney, Agent, or Firm* — Wilson, Sonsini, Goodrich & Rosati

(57) ABSTRACT

Disclosed are platforms, systems, media, and methods comprising: a software module configured to allow generation of a dare campaign, a dare campaign having parameters comprising a creator, a target, a challenge, funds raised, and a beneficiary; and a software module configured to generate a dare campaign community, a dare campaign community organized around a primary dare campaign and characterized by one or more of: a primary dare campaign having a challenge defined by a community member other than the creator or the target; one or more child dare campaigns, wherein a child dare campaign has parameters defaulted to those of the primary dare campaign, wherein the parameters are customizable by the creator of the child dare campaign; and one or more clone dare campaigns, wherein a clone dare campaign has parameters linked to the primary dare campaign, wherein the linked parameters include at least the challenge.

30 Claims, 19 Drawing Sheets

DARE CAMPAIGN PLATFORM

BACKGROUND OF THE INVENTION

Fund raising is the process of soliciting and gathering voluntary contributions of money or other resources, by requesting donations from individuals, businesses, or organizations. In some cases, fund raising refers to efforts to gather money for non-profit organizations. In other cases, it is used to refer to the identification and solicitation of investors or other sources of capital for-profit enterprises. Traditionally, fundraising consisted mostly of asking for donations on the street or door-to-door. More recently, new forms of fundraising such as online fundraising have emerged.

SUMMARY OF THE INVENTION

One of the most effective forms of online fund raising is crowd funding. Crowd funding is the collective effort of individuals who network and pool their money, usually via the web, to support efforts initiated by other people or organizations. Existing online fund raising, however, fails to adequately engage users or provide any entertainment value. Current methods also fail to provide convenient ways for celebrities and other influential individuals to get involved and use their appeal to raise funds. Importantly, no traditional or online fund raising techniques allow creation of fund raising campaign communities, wherein a user can participate by challenging themselves along with others with whom they are aligned.

Advantages of the platforms, systems, media, and methods described herein include interconnected dare campaign communities organized around a primary campaign. Further advantages include, by way of non-limiting examples, dare campaigns having a challenge defined by the community, child dare campaigns offering the ability for a performer of a dare to challenge others to create their own dare, and clone dare campaigns offering the ability for more than one user to create the same dare.

In one aspect, disclosed herein are non-transitory computer-readable storage media encoded with a computer program including instructions executable by a processor to create an application comprising: a software module configured to allow the generation of a dare campaign, a dare campaign having parameters comprising a creator, a target, a challenge, a goal, funds raised, and a beneficiary, the challenge activated when the goal is reached; and a software module configured to generate a dare campaign community, a dare campaign community organized around a primary dare campaign and characterized by 1, 2, or all of: a primary dare campaign having a challenge defined by a community member other than the creator or the target; one or more child dare campaigns, wherein a child dare campaign has parameters defaulted to those of the primary dare campaign, wherein the parameters are customizable by the creator of the child dare campaign; and one or more clone dare campaigns, wherein a clone dare campaign has parameters linked to the primary dare campaign, wherein the linked parameters include at least the challenge. In some embodiments, a dare campaign further comprises parameters comprising a length of time to reach the goal or a length of time to complete the challenge. In some embodiments, the software module configured to allow the generation of a dare campaign provides a display indicating the current phase of the dare campaign. In further embodiments, the current phase is selected from: pledging, voting, and complete. In some embodiments, the application further comprises a software module configured to allow submission of media, the media documenting performance of the challenge by the target. In further embodiments, the media comprises text, a photo, an audio file, or a video. In some embodiments, the application further comprises a software module configured to allow voting on the media, the funds raised provided to the beneficiary when the voting reaches a threshold. In further embodiments, the threshold is determined by a number of votes or a percentage of votes indicating affirmative performance of the challenge. In further embodiments, a dare campaign further comprises a length of time to reach the voting threshold. In some embodiments, the application further comprises a software module configured to allow pledging, a pledge contributing funds raised toward the goal. In some embodiments, the target is a person. In further embodiments, the person is an influencer or celebrity. In some embodiments, the target is a group or organization. In some embodiments, the beneficiary is the target. In some embodiments, the beneficiary is a charity. In some embodiments, a dare campaign community comprises a hierarchical user interface, wherein the primary dare campaign is displayed above related child and clone dare campaigns. In some embodiments, a dare campaign community comprises a primary dare campaign with an influencer or celebrity target, wherein the dare campaign community comprises plurality of child dare campaigns with a creator that is a fan of the influencer or celebrity. In some embodiments, a dare campaign community comprises a primary dare campaign with an influencer or celebrity target, wherein the dare campaign community comprises plurality of clone dare campaigns with a creator that is a fan of the influencer or celebrity. In some embodiments, a child dare campaign or a clone dare campaign is created with a single user interaction.

In another aspect, disclosed herein are computer-implemented systems comprising: a digital processing device comprising an operating system configured to perform executable instructions and a memory device; and a computer program including instructions executable by the digital processing device to create an application comprising: a software module configured to allow generation of a dare campaign, a dare campaign having parameters comprising a creator, a target, a challenge, a goal, funds raised, and a beneficiary, the challenge activated when the goal is reached; and a software module configured to generate a dare campaign community, a dare campaign community organized around a primary dare campaign and characterized by 1, 2, or all of: a primary dare campaign having a challenge defined by a community member other than the creator or the target; one or more child dare campaigns, wherein a child dare campaign has parameters defaulted to those of the primary dare campaign, wherein the parameters are customizable by the creator of the child dare campaign; and one or more clone dare campaigns, wherein a clone dare campaign has parameters linked to the primary dare campaign, wherein the linked parameters include at least the challenge. In some embodiments, a dare campaign further comprises parameters comprising a length of time to reach the goal or a length of time to complete the challenge. In some embodiments, the software module configured to allow generation of a dare campaign provides a display indicating the current phase of the dare campaign. In further embodiments, the current phase is selected from: pledging, voting, and complete. In some embodiments, the application further comprises a software module configured to allow submission of media, the media documenting performance of the challenge by the target. In further embodiments, the media comprises text, a photo, an audio file, or a video. In some embodiments, the application further comprises a software module configured to allow voting on the media, the funds raised provided to the beneficiary when the voting reaches a threshold. In further embodiments, the threshold is determined by a number of votes or a percentage of votes indicating affirmative performance of the challenge. In further embodiments, a dare campaign further comprises a length of time to reach the voting threshold. In some embodiments, the application further comprises a software module configured to allow pledging, a pledge contributing funds raised toward the goal. In some embodiments, the target is a person. In further embodiments, the person is an influencer or celebrity. In some embodiments, the target is a group or organization. In some embodiments, the beneficiary is the target. In some embodiments, the beneficiary is a charity. In some embodiments, a dare campaign community comprises a hierarchical user interface, wherein the primary dare campaign is displayed above related child and clone dare campaigns. In some embodiments, a dare campaign community comprises a primary dare campaign with an influencer or celebrity target, wherein the dare campaign community comprises plurality of child dare campaigns with a creator that is a fan of the influencer or celebrity. In some embodiments, a dare campaign community comprises a primary dare campaign with an influencer or celebrity target, wherein the dare campaign community comprises plurality of clone dare campaigns with a creator that is a fan of the influencer or celebrity. In some embodiments, a child dare campaign or a clone dare campaign is created with a single user interaction.

In another aspect, disclosed herein are non-transitory computer-readable storage media encoded with a dare campaign community; the community comprising a plurality of dare campaigns, each dare campaign having parameters comprising a creator, a target, a challenge, a goal, funds raised, and a beneficiary, the challenge activated when the goal is reached; the community organized around a primary dare campaign and characterized by 1, 2, or all of: a primary dare campaign having a challenge defined by a community member other than the creator or the target; one or more child dare campaigns, wherein a child dare campaign has parameters defaulted to those of the primary dare campaign, wherein the parameters are customizable by the creator of the child dare campaign; and one or more clone dare campaigns, wherein a clone dare campaign has parameters linked to the primary dare campaign, wherein the linked parameters include at least the challenge. In some embodiments, each dare campaign further comprises parameters comprising a length of time to reach the goal or a length of time to complete the challenge. In some embodiments, each dare campaign comprises an interface configured to allow submission of media, the media documenting performance of the challenge by the target. In some embodiments, the media comprises text, a photo, an audio file, or a video. In some embodiments, each dare campaign comprises an interface configured to allow voting on the media, the funds raised provided to the beneficiary when the voting reaches a threshold. In further embodiments, wherein the threshold is determined by a number of votes or a percentage of votes indicating affirmative performance of the challenge. In some embodiments, each dare campaign comprises an interface configured to allow pledging, a pledge contributing funds raised toward the goal. In some embodiments, the dare campaign community comprises a hierarchical user interface, wherein the primary dare campaign is displayed above related child and clone dare campaigns. In some embodiments, the dare campaign community comprises a primary dare campaign with an influencer or celebrity target, wherein the dare campaign community comprises plurality of child dare campaigns with a creator that is a fan of the influencer or celebrity. In some embodiments, the dare campaign community comprises a primary dare campaign with an influencer or celebrity target, wherein the dare campaign community comprises plurality of clone dare campaigns with a creator that is a fan of the influencer or celebrity. In some embodiments, the primary dare campaign has a challenge selected by the target or selected by voting. In some embodiments, the dare campaign provides a display indicating the current phase of the dare campaign. In further embodiments, the current phase is selected from: pledging, voting, and complete. In some embodiments, a child dare campaign or a clone dare campaign is created with a single user interaction.

In another aspect, disclosed herein are computer-implemented methods of fund raising comprising: associating, by a computer, a primary dare campaign with one or more clone dare campaigns to form a dare campaign community; each dare campaign having parameters comprising: a creator, a target, a challenge, a fund raising goal, funds raised, and a beneficiary; wherein each clone dare campaign shares the beneficiary of the primary dare campaign; presenting, by the computer, a user interface, wherein the interface presents the dare campaigns organized to represent the association between the primary dare campaign and the one or more clone dare campaigns; and collecting, by the computer, pledges from users in one or more of the dare campaigns, the pledges comprising funds raised; wherein the challenge is activated when the funds raised reach the fund raising goal; wherein at least a portion of the funds raised are distributed to the beneficiary upon successful completion of the activated challenge by the target. In some embodiments, the target is a celebrity or influential individual or group. In some embodiments, the beneficiary is a charitable organization. In some embodiments, successful completion of the activated challenge is documented by upload of media. In further embodiments, the media comprises text, a photo, an audio file, or a video. In some embodiments, the adequacy of the media as documentation of successful completion of the activated challenge is determined by user voting.

BRIEF DESCRIPTION OF THE DRAWINGS

FIG. 1 shows a non-limiting example of a user guidelines pop-up for a dare campaign platform; in this case, a pop-up including user guidelines for creating dare campaigns, promoting dare campaign, and participating in dare campaigns.

FIG. 7 shows a non-limiting example of a dare campaign creation interface; in this case, an interface allowing a user to input basic dare information including a dare image, a dare name, a text description, a target, a pledge duration, a voting duration, a beneficiary, and a goal amount.

FIG. 13 shows a non-limiting example of a dare pledging interface; in this case, an interface allowing a user to input a pledge amount, select an available reward associated with the dare, and optionally make the pledge anonymous.

DETAILED DESCRIPTION OF THE INVENTION

Figure 2:
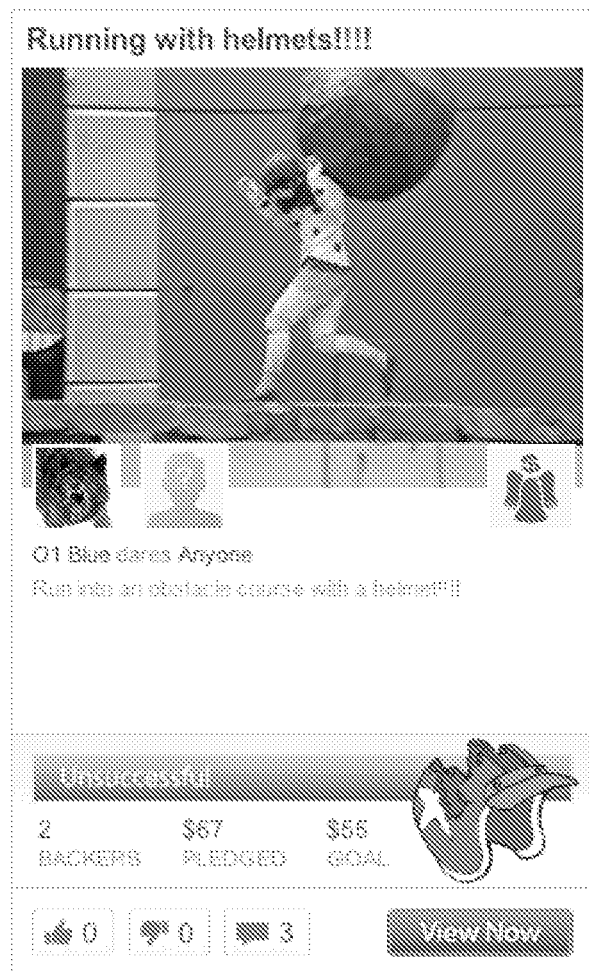
FIGS. 2-3 shows non-limiting examples of a dare campaign summary display; in these cases, a dare campaign summary display for a dare not successfully completed.

Described herein, in certain embodiments, are non-transitory computer-readable storage media encoded with a computer program including instructions executable by a processor to create an application comprising: a software module configured to allow generation of a dare campaign, a dare campaign having parameters comprising a creator, a target, a challenge, a goal, funds raised, and a beneficiary, the challenge activated when the goal is reached; and a software module configured to generate a dare campaign community, a dare campaign community organized around a primary dare campaign and characterized by one or more of: a primary dare campaign having a challenge defined by a community member other than the creator or the target; one or more child dare campaigns, wherein a child dare campaign has parameters defaulted to those of the primary dare campaign, wherein the parameters are customizable by the creator of the child dare campaign; and one or more clone dare campaigns, wherein a clone dare campaign has parameters linked to the primary dare campaign, wherein the linked parameters include at least the challenge.

Also described herein, in certain embodiments, are computer-implemented systems comprising: a digital processing device comprising an operating system configured to perform executable instructions and a memory device; and a computer program including instructions executable by the digital processing device to create an application comprising: a software module configured to allow generation of a dare campaign, a dare campaign having parameters comprising a creator, a target, a challenge, a goal, funds raised, and a beneficiary, the challenge activated when the goal is reached; and a software module configured to generate a dare campaign community, a dare campaign community organized around a primary dare campaign and characterized by one or more of: a primary dare campaign having a challenge defined by a community member other than the creator or the target; one or more child dare campaigns, wherein a child dare campaign has parameters defaulted to those of the primary dare campaign, wherein the parameters are customizable by the creator of the child dare campaign; and one or more clone dare campaigns, wherein a clone dare campaign has parameters linked to the primary dare campaign, wherein the linked parameters include at least the challenge.

Also described herein, in certain embodiments, are non-transitory computer-readable storage media encoded with a dare campaign community; the community comprising a plurality of dare campaigns, each dare campaign having parameters comprising a creator, a target, a challenge, a goal, funds raised, and a beneficiary, the challenge activated when the goal is reached; the community organized around a primary dare campaign and characterized by one or more of: a primary dare campaign having a challenge defined by a community member other than the creator or the target; one or more child dare campaigns, wherein a child dare campaign has parameters defaulted to those of the primary dare campaign, wherein the parameters are customizable by the creator of the child dare campaign; and one or more clone dare campaigns, wherein a clone dare campaign has parameters linked to the primary dare campaign, wherein the linked parameters include at least the challenge.

Also described herein, in certain embodiments, are computer-implemented methods of fund raising comprising: associating, by a computer, a primary dare campaign with one or more clone dare campaigns to form a dare campaign community; each dare campaign having parameters comprising: a creator, a target, a challenge, a fund raising goal, funds raised, and a beneficiary; wherein each clone dare campaign shares the beneficiary of the primary dare campaign; presenting, by the computer, a user interface, wherein the interface presents the dare campaigns organized to represent the association between the primary dare campaign and the one or more clone dare campaigns; and collecting, by the computer, pledges from users in one or more of the dare campaigns, the pledges comprising funds raised; wherein the challenge is activated when the funds raised reach the fund raising goal; wherein at least a portion of the funds raised are distributed to the beneficiary upon successful completion of the activated challenge by the target.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "dare" means a challenge intended for performance by another as part of a fund raising campaign.

As used herein, the term "dare campaign" means a fund raising campaign including a challenge that must be performed by a target to make funds raised available to one or more beneficiaries.

As used herein, the term "dare campaign community" means a primary dare campaign and one or more secondary dare campaigns linked by a relationship and presented in a dare campaign community user interface that reflects these relationships.

Dare Campaign Platform

In some embodiments, the platforms, systems, media, and methods described herein include an application creating a dare campaign, or use of the same. In further embodiments, a dare campaign is a fund raising campaign. A dare campaign suitably has many parameters, which are configured by a creator (or alternatively by the community as described herein).

In some embodiments, a dare campaign includes a name. In some cases, the name suitably reflects an associated challenge. In other cases, the name suitably reflects a target or a beneficiary. In some embodiments, a dare campaign includes a descriptive video. In further embodiments, the descriptive video is provided by the creator to communicate details of a challenge, a target, a beneficiary, and other details of the dare campaign.

In some embodiments, a dare campaign includes a challenge. In further embodiments, the challenge is one or more tasks that must be performed by an individual, group, or organization to complete the dare. In some embodiments, a dare campaign includes one challenge configured by the creator of the campaign. In other embodiments, a dare campaign includes a plurality of challenges configured by the creator of the campaign. In various embodiments, a dare campaign suitably includes 2, 3, 4, 5, 6, 7, 8, 9, 10, 11, 12, 13, 14, 15, 16, 17, 18, 19, 20 or more challenges configured by the creator of the campaign. In further embodiments, the dare campaign with multiple challenges also includes a configured means to select one or more challenges from among the plurality of challenges.

By way of example, in some embodiments, other users can comment and vote to select a challenge. In further embodiments, once the voting period is closed, the challenge with the highest number of votes is selected. In some embodiments, a creator of a dare campaign optionally allows any user to vote on a dare for the campaign. In other embodiments, a creator of a dare campaign optionally allows a limited group of users to vote on a dare for the campaign. In further embodiments, votes are allowed from a fan base, a social circle, a defined community, or the like.

By way of further example, in some embodiments, a challenge is selected by the amount of funds raised (e.g., user pledges). In further embodiments, once the pledging period is closed, the challenge with the highest amount of funds raised is selected. In such embodiments, the challenge is selected to maximize donations.

In some embodiments, a dare campaign includes a target. In further embodiments, the target is the party that must perform the challenge to complete the dare. Many types of targets are suitable. In various embodiments, suitable targets include, by way of non-limiting examples, a specific individual, a plurality of individuals, a group, and an organization. In further embodiments, an individual is a celebrity or influential individual (e.g., an influencer, trendsetter, role model, public figure, athlete, entertainer, artist, etc.). In some embodiments, the target is any users willing to take on the dare. In other embodiments, the nature of the challenge associated with a dare campaign is such that it can only be completed by a specific target.

In some embodiments, a dare campaign includes an amount of funds raised. In further embodiments, funds are raised by user pledges. In some embodiments, a dare campaign includes a pre-determined amount of time allowed for users to pledge funds. In some embodiments, a dare campaign includes a goal. In further embodiments, the goal is the amount of funds raised required to activate the challenge. In other embodiments, a goal is optional and the challenge is active without regard to an amount of funds raised. In some embodiments, a dare campaign includes a beneficiary. In further embodiments, the beneficiary receives all or a portion of the funds raised upon submission of adequate proof that a challenge has been completed. Many types of beneficiaries are suitable. In various embodiments, suitable beneficiaries include, by way of non-limiting examples, the creator, the target (or other user successfully performing the challenge associated with the dare campaign), a third-party individual, and an organization such as a for-profit organization, a not-for-profit organization, or a charity. In some embodiments, a beneficiary comprises one individual, group, or organization. In other embodiments, a beneficiary comprises a plurality of individuals, groups, organizations, or combinations thereof. In cases where a beneficiary comprises a plurality of individuals, groups, and/or organizations, the dare campaign is optionally configured to distribute funds raised based on any suitable allocation scheme.

In some embodiments, a dare campaign includes media uploaded by a target that demonstrates completion of the challenge. In further embodiments, a dare campaign includes a pre-determined amount of time allowed for upload of media demonstrating completion of the challenge. In further embodiments, the community of users votes on whether the media adequately demonstrates completion of the challenge.

In some embodiments, the platforms, systems, media, and methods described herein include an application creating a dare campaign platform, or use of the same. In various embodiments, a dare campaign platform offers software modules, databases, and user interfaces to facilitate a wide range user activities, including by way of non-limiting examples, creating a dare campaign, pledging money towards a dare campaign, taking on a dare, voting on a dare campaign, and suggesting a celebrity dare. In some embodiments, a dare campaign platform presents a dare campaign summary display for each dare campaign created and presents a catalog of summaries allowing a user to browser created campaigns. In further embodiments, a dare campaign platform presents a dare campaign detail display for each dare campaign created.

In some embodiments, a dare campaign platform allows a user to create a dare campaign. For example, a creating user specifies the actual dare (e.g., the challenge), the creator uploads an image representing the dare, specifies a goal amount the creating user is trying to raise, and specifies whether the money benefits a charity or if the funds raised benefit the creator of the dare and/or the person taking on the dare. In some embodiments, the creator also has the option of assigning rewards towards different levels of pledging, the dare creator optionally includes a video telling everyone why their dare is so daring or any other background info. In some embodiments, the creator also includes text in a word document providing background information. In some embodiments, once the dare campaign is live, users comment on the dare and interact with anyone involved with the dare campaign through a comments section.

In some embodiments, a dare campaign platform allows a user to pledge money towards a dare campaign. For example, a user optionally pledges money towards the goal amount specified in a particular dare campaign. In some embodiments, the platform initially only authorizes the charge, without conducting the transaction. In further embodiments, if the dare is successfully completed, then the platform completes the transaction and charges the pledging user. In still further embodiments, if the dare isn't successfully completed, the pledging user isn't charged at all.

In some embodiments, a dare campaign platform allows a user to take on a dare. For example, a user optionally takes on a dare by uploading media as proof of completion of the particular challenge associated with the dare.

In some embodiments, a dare campaign platform allows a user to vote on a dare campaign. For example, once a user decides to take on a dare campaign, and the user uploads video proof (they can do this whether the goal was met or not), then any user can vote on whether the video really does prove completion of the challenge. In some embodiments, a simple majority of votes is enough. In further embodiments, if there is more than one video uploaded, the video with highest positive percentage of votes is used to evaluate voting.

In some embodiments, a dare campaign platform allows a user to suggest a dare for another user. In some embodiments, a dare campaign platform allows a user to suggest a celebrity dare. For example, in some embodiments, a user optionally lists their favorite celebrity dares. In further embodiments, other users optionally vote on dares and even comment on them. In still further embodiments, the celebrity dare selections will be displayed in order of the most votes to the least.

Figure 1:
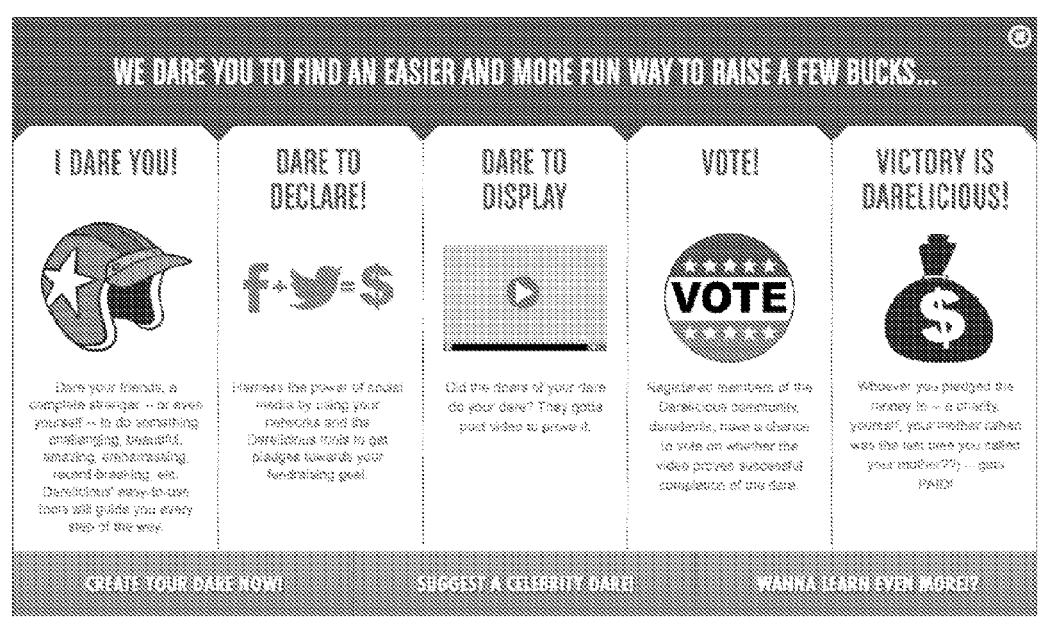

Referring to FIG. 1, in a particular embodiment, a pop-up provides user guidelines for a dare campaign platform. In this embodiment, the guidelines cover creating dare campaigns, promoting dare campaign, and participating in dare campaigns.

Figure 3:
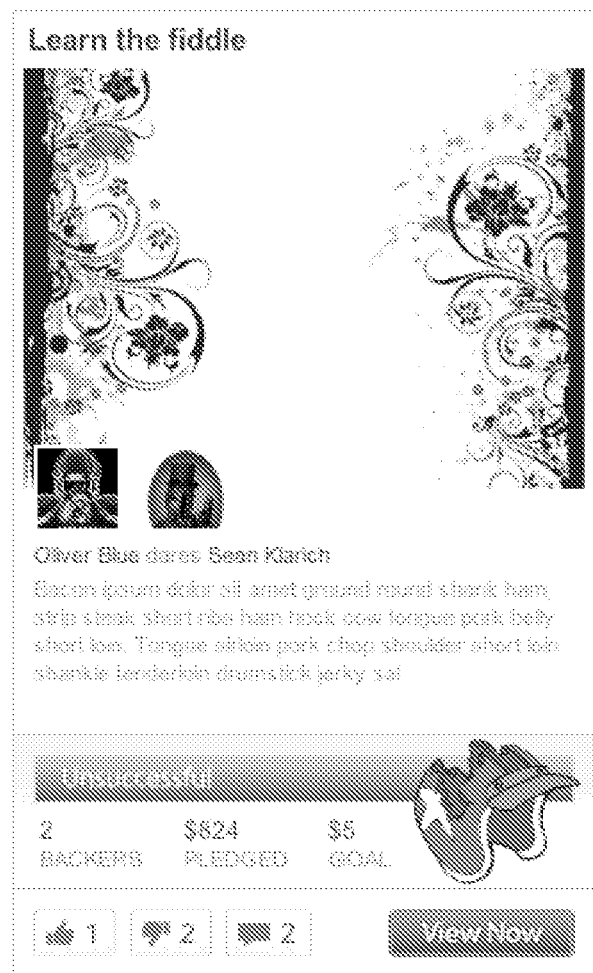

Referring to FIGS. 2 and 3, in particular embodiments, a dare campaign summary display provides information describing the dare campaign including a name (e.g., title), a text description, and a descriptive image. In these embodiments, the dare campaign summary display further provides the creator (name and profile image), the target (any user in this case), an icon indicating that the beneficiary is a charitable organization, a number of backers, a total funds raised (e.g., amount pledged), and a goal amount for the funds raised. Because the particular dare campaigns summarized in the dare campaign summary displays have not been successfully completed, the summaries are marked "Unsuccessful."

Figure 4:
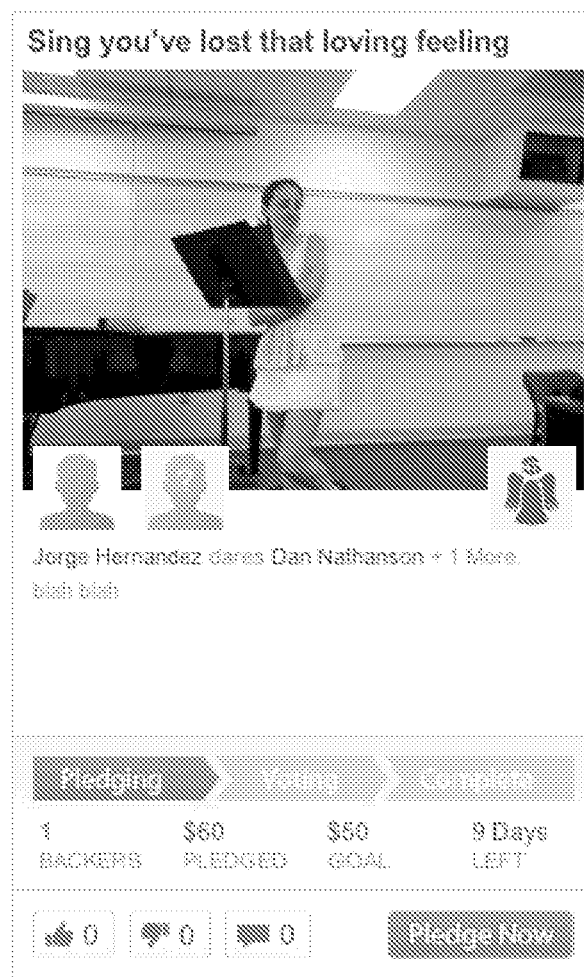
FIG. 4 shows a non-limiting example of a dare campaign summary display; in this case, a dare campaign summary display for a dare in the pledging phase.

Referring to FIG. 4, in a particular embodiment, a dare campaign summary display provides information describing the dare campaign including a name (e.g., title), a text description, and a descriptive image. In this embodiment, the dare campaign summary display further provides the creator (name and profile image), the target (any user in this case), an icon indicating that the beneficiary is a charitable organization, a number of backers, a total funds raised (e.g., amount pledged), and a goal amount for the funds raised. Because the particular dare campaign summarized in the dare campaign summary display is in the pledging phase, the dare campaign summary display includes a "Pledge Now" button providing uses access to a pledging interface. See, e.g., FIG. 13.

Figure 5:
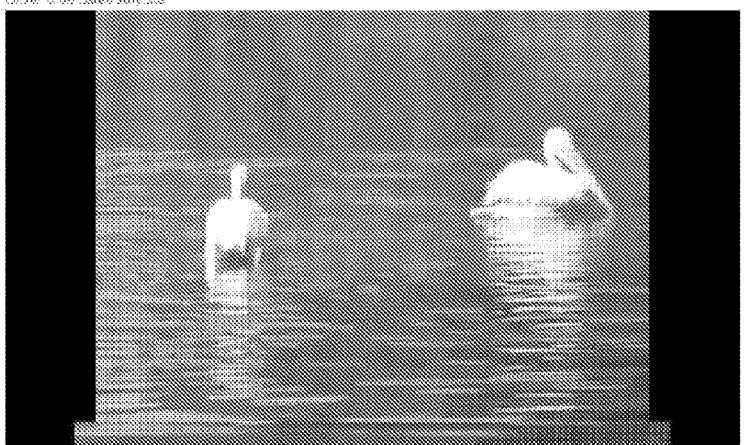
FIG. 5 shows a non-limiting example of a dare campaign detail display; in this case, a dare campaign detail display for an dare in the voting phase and including a name, a text description, a representative image, and dare information (e.g., number of backers, funds raised, fund raising goal, time left to meet goal). This example also includes a video uploaded to demonstrate performance of the challenge and functionality to allow commenting, voting, and upload of media.

Referring to FIG. 5, in a particular embodiment, a dare campaign detail display offers users information on many aspects of a particular dare campaign. In this embodiment, the dare campaign detail display includes navigational elements allowing a user to access information on updates, backers, comments, and media submissions. The dare campaign detail display in this embodiment, presents descriptive information including a name and text description and a descriptive video. The dare campaign detail display in this embodiment, also presents a visual indicator of the current phase of the dare campaign. The phases include: a pledging phase wherein users contribute funds toward a goal, a voting phase wherein a challenge has become active, a user has uploaded media demonstrating their successful completion of the challenge, and other uses optionally vote on the persuasiveness of the media, and a completed phase.

Figure 6:
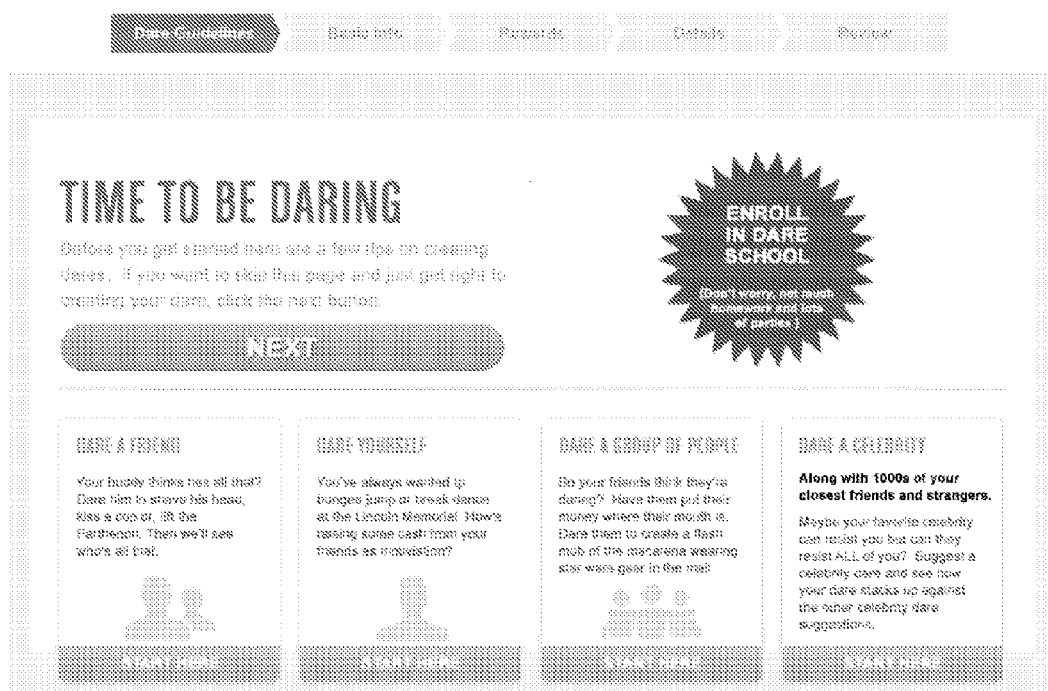
FIG. 6 shows a non-limiting example of a user guidelines pop-up for dare campaign creation; in this case, a pop-up including user guidelines for daring a friend, daring oneself, daring a group, and daring a celebrity.

Referring to FIG. 6, in a particular embodiment, a pop-up provides user guidelines for dare campaign creation. In this embodiment, the guidelines cover daring a friend, daring oneself, daring a group, and daring a celebrity.

Figure 7:
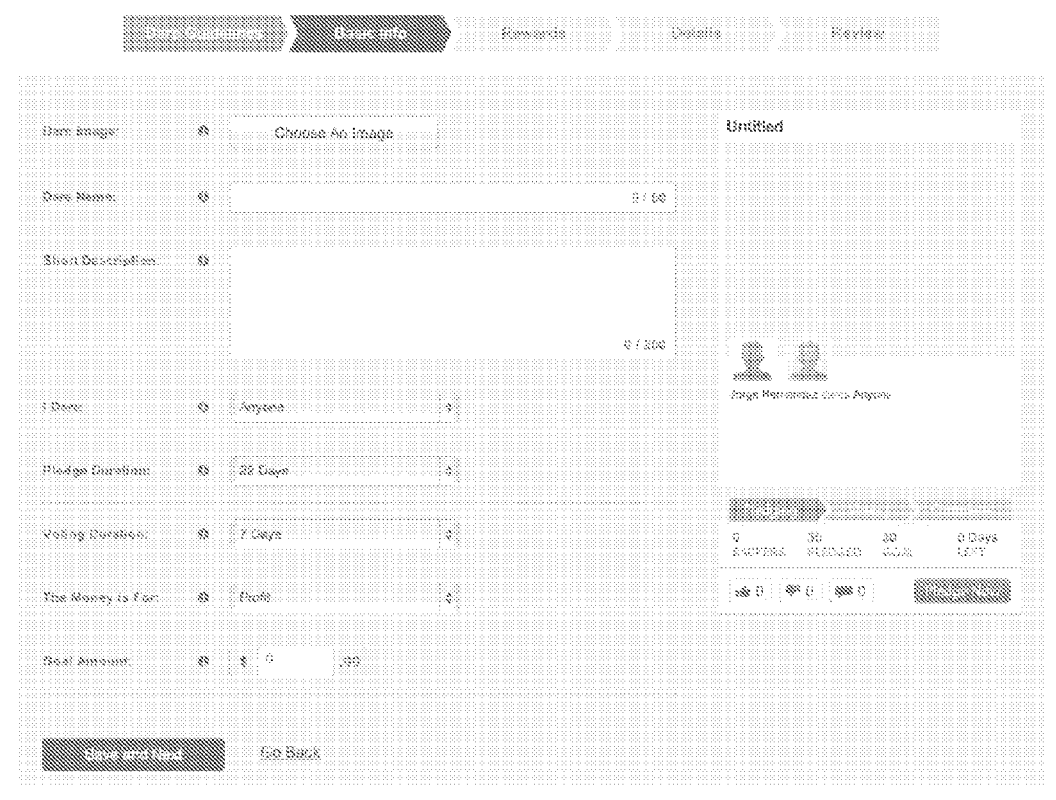

Referring to FIG. 7, in a particular embodiment, a dare campaign creation interface provides features to allow a user to input basic dare campaign information including a dare image, a dare name, a text description (e.g., the particular challenge), a target, a pledge duration (i.e., the time available for pledging), a voting duration (i.e., the time available for voting on submitted media), a beneficiary, and a goal amount for the funds raised. In this embodiment, the a dare campaign creation interface generates a dare campaign summary (e.g., a widget, etc.) that displays the name, image, creator, target, number of backers, total amount pledged, goal, and days left to pledge. Further in this embodiment, the dare campaign summary includes a visual indicator of the current phase of the dare campaign that illustrates the campaign's progress through the pledging, voting, and completion phases. Still further in this embodiment, the dare campaign summary includes interface elements allowing a user to comment on the dare campaign and make a pledge.

Figure 11:
FIG. 11 shows a non-limiting example of a dare campaign creation interface; in this case, an interface allowing a user to review dare detail information prior to publishing.

Referring to FIG. 11, in a particular embodiment, a dare campaign creation interface provides important information for a dare campaign creator to review prior to publishing their dare campaign on the platform. In this embodiment, the important information includes information specific to charitable dare campaigns and for profit dare campaigns.

Figure 12:
FIG. 12 shows a non-limiting example of a pop-up for sharing a dare campaign via social networking.

Referring to FIG. 12, in a particular embodiment, a pop-up for sharing a dare campaign via social networking includes elements allowing a user to share a dare campaign via Facebook and/or Twitter.

Figure 14:
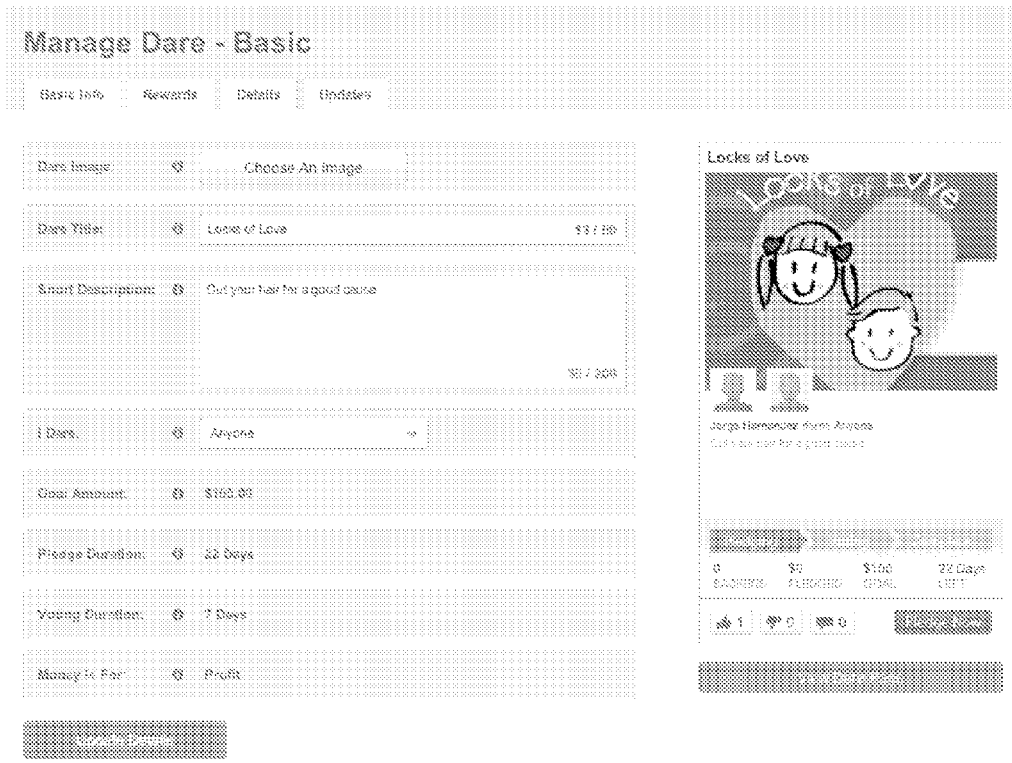
FIG. 14 shows a non-limiting example of a dare campaign management interface; in this case, a dare campaign management interface allowing a user to adjust basic dare information.

Referring to FIG. 14, in a particular embodiment, a dare campaign management interface provides features to allow a user to edit basic dare information including the descriptive image, the title, the text description (e.g., the particular challenge), the target, the goal amount for the funds raised, the time available for pledging, the time available for voting on submitted media, and the beneficiary.

Figure 17:
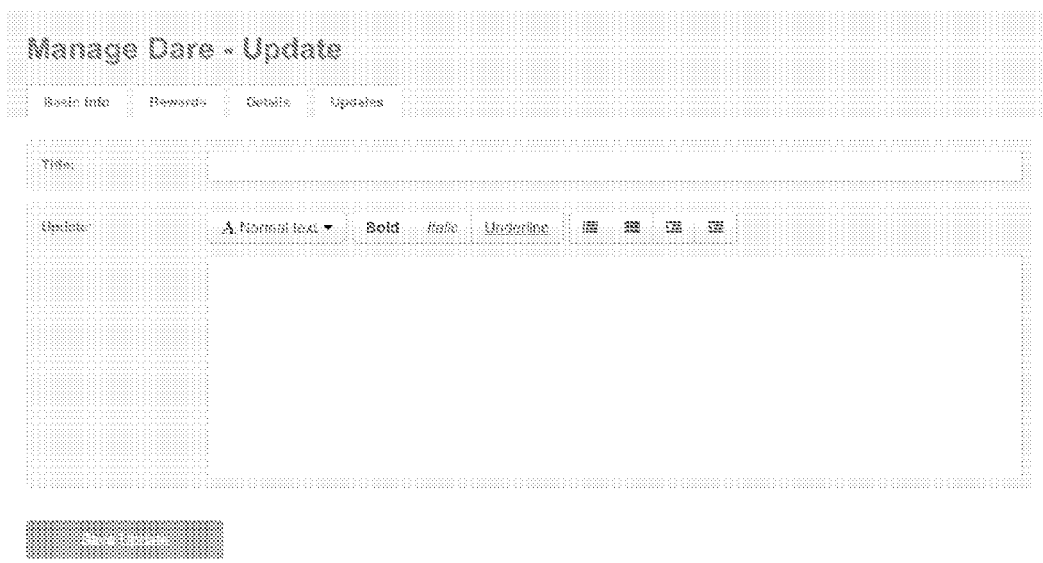
FIG. 17 shows a non-limiting example of a dare campaign management interface; in this case, a dare campaign management interface allowing a user to create dare updates.

Referring to FIG. 17, in a particular embodiment, a dare campaign management interface provides features to allow a user to update a dare campaign by editing the name (e.g., title) or typing text updates to be associated with the dare campaign.

Figure 18:
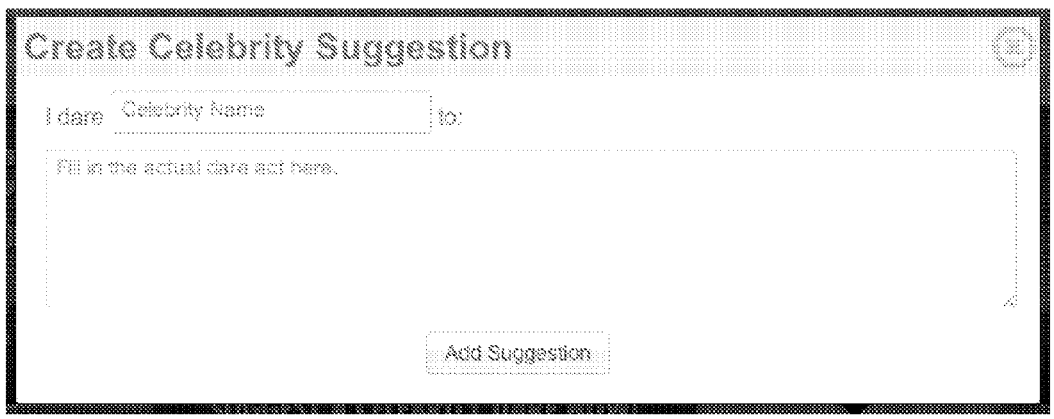
FIG. 18 shows a non-limiting example of a pop-up for suggesting a celebrity dare.

Referring to FIG. 18, in a particular embodiment, a pop-up for suggesting a celebrity dare allows a user to identify a particular celebrity or influencer and describe a suggested challenge to be associated with a dare campaign with the identified celebrity or influencer as the target.

Media

In some embodiments, the platforms, systems, media, and methods described herein include media, or use of the same. In further embodiments, media is utilized, for example, to describe a dare campaign, encourage participation, and the like. In still further embodiments, media is utilized to describe a challenge, a celebrity target, a charitable beneficiary, and the like. In some embodiments, media is utilized, for example, to prove, demonstrate, or document completion of a challenge associated with a dare campaign. In some embodiments, media is utilized, for example, to comment on a dare campaign or provide an update on a dare campaign. In some embodiments, the platforms, systems, media, and methods described herein include a software module configured to allow submission of media, or use of the same.

Many types of media are suitable. In some embodiments, suitable media include text, documents, audio, images (e.g., photographs, illustrations, etc.), videos, multimedia (e.g., interactive elements, etc.), or combinations of the same.

Many text formats are suitable including, by way of non-limiting examples, Rich Text Format (RTF), TXT, ASCII, UTF-8, and HTML formatted text. Many document formats are suitable including, by way of non-limiting examples, Microsoft® Office Word®, Microsoft® Office PowerPoint®, Microsoft Office Excel®, DocBook, HTML, OpenDocument, PalmDoc, Portable Document Format (PDF), Rich Text Format (RTF), and WordPerfect.

Many audio formats are suitable including, by way of non-limiting examples, MP3, WAV, AIFF, AU, Apple® Lossless, MPEG-4, Windows Media®, Vorbis, AAC, and Real Audio®.

Many raster image formats are suitable including, by way of non-limiting examples, Joint Photographic Experts Group (JPEG), JPEG 2000, Exchangeable image file format (EXIF), Tagged Image File Format (TIFF), RAW, Portable Network Graphics (PNG), Graphics Interchange Format (GIF), Windows® bitmap (BMP), portable pixmap (PPM), portable graymap (PGM), portable bitmap file format (PBM), wireless bitmap (WBMP), and WebP. In some embodiments, images are uncompressed (e.g., RAW format). In other embodiments, images are compressed. Both lossy and lossless image CODECs are suitable. Many vector image formats are suitable including, by way of non-limiting examples, CGM and SWF. Both two-dimensional and three-dimensional vector images are suitable.

Many video formats are suitable including, by way of non-limiting examples, Windows® Media Video (WMV), Windows® Media®, Motion Picture Experts Group (MPEG), Audio Video Interleave (AVI), Apple® QuickTime®, RealMedia®, Flash Video, Motion JPEG (M-JPEG), WebM, and Advanced Video Coding High Definition (AVCHD). In some embodiments, video is uncompressed (e.g., RAW format). In other embodiments, video is compressed. Both lossy and lossless video CODECs are suitable including, by way of non-limiting examples, DivX™, Cineform, Cinepak, Dirac, DV, FFV1, H.263, H.264, H.264 lossless, JPEG 2000, MPEG-1, MPEG-2, MPEG-4, On2 Technologies (VP5, VP6, VP7, and VP8), RealVideo, Snow lossless, Sorenson Video, Theora, and Windows Media Video (WMV).

In some embodiments, image and/or video media are standard-definition. In other embodiments, image and/or video media are high-definition. In further embodiments, a high-definition image or video frame includes at least about 1280× about 720 pixels or at least about 1920×about 1080 pixels.

Many multimedia formats are suitable including, by way of non-limiting examples, Adobe® Flash®, Apple® QuickTime®, Microsoft® Silverlight®, Java™, HTML 5, XHTML 5, and Unity®.

In some embodiments, media include metadata. In further embodiments, the metadata describes the location, date, time, resolution, and/or creator of the media. In still further embodiments, metadata describes the device settings (e.g., camera, smartphone, handheld computing device, etc.) used to create the media.

Referring to FIG. 5, in a particular embodiment, a dare campaign detail display provides information on a dare campaign targeted to any user and includes a video uploaded to describe the challenge associated with the dare campaign. This particular embodiment also includes a link to "submissions" section of the dare campaign detail display, which provides user access to media uploaded to demonstrate performance of the challenge.

Figure 10:
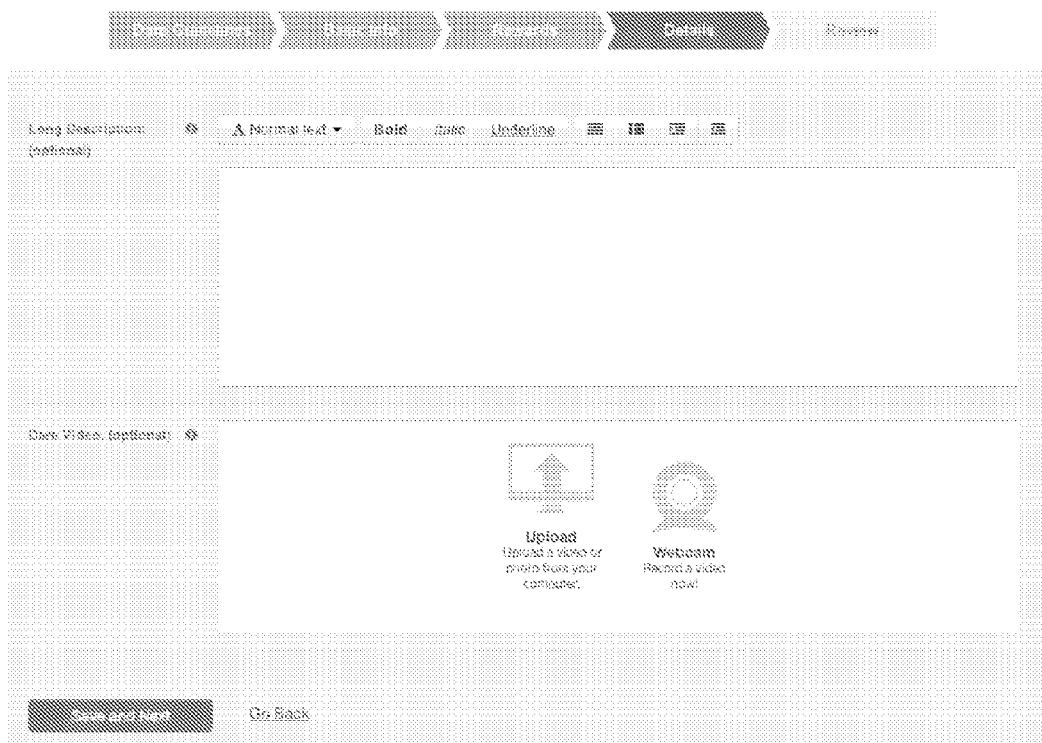
FIG. 10 shows a non-limiting example of a dare campaign creation interface; in this case, an interface allowing a user to input dare detail information including a long text description and a descriptive video.

Referring to FIG. 10, in a particular embodiment, a dare campaign creation interface provides features to allow a dare campaign creator to submit a video describing one or more aspects of the dare campaign. In this embodiment, the dare campaign creation interface is configured to allow upload of an archived media file or creation of a media file in real time via a web cam associated with a user's computer.

Figure 16:
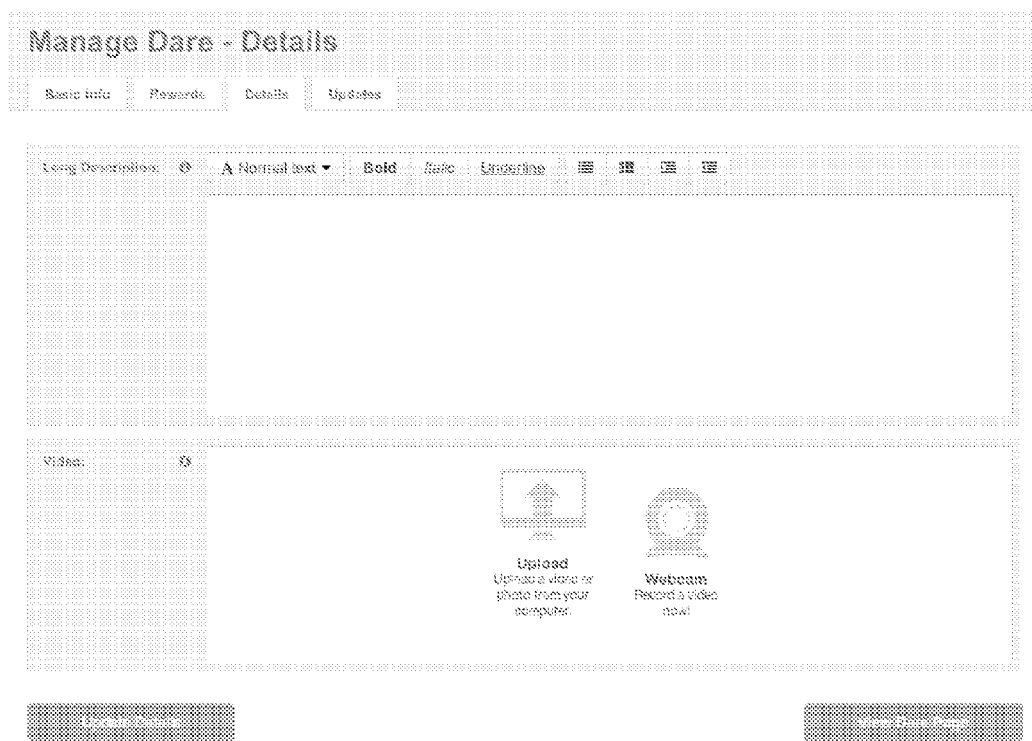
FIG. 16 shows a non-limiting example of a dare campaign management interface; in this case, a dare campaign management interface allowing a user to adjust dare detail information.

Referring to FIG. 16, in a particular embodiment, a dare campaign management interface provides features to allow a dare campaign creator to submit a video describing one or more aspects of the dare campaign. In this embodiment, the dare campaign management interface is configured to allow upload of an archived media file or creation of a media file in real time via a web cam associated with a user's computer.

Voting

In some embodiments, the platforms, systems, media, and methods described herein include voting, or use of the same. In further embodiments, voting is utilized, for example, to determine whether an uploaded media file adequately demonstrates, proves, or documents successful completion of a challenge associated with a dare campaign. In some embodiments, if and when user voting reaches a particular threshold, the challenge is considered successfully completed and the funds raised are provided to the beneficiary as configured by the creator. In some embodiments, a dare campaign includes a pre-determined length of time to reach the voting threshold, which is configured by the creator of the dare campaign. In some embodiments, the platforms, systems, media, and methods described herein include a software module configured to allow user voting on media, or use of the same.

Many methods of voting are suitable. In some embodiments, users suitably vote by selecting a Boolean value such as "Yes" or "No," "Affirmative" or "Negative," or "Complete" or "Incomplete," or the like. In other embodiments, users suitably vote by scoring media in a numeric or non-numeric scale such as 1-10, 1-100, A-F, 1 star-5 stars, or the like. In further embodiments, a vote higher on a scale indicates successful performance of the challenge associated with a dare campaign. In a particular embodiment, users suitably vote by scoring media on a Likert scale (e.g., a 5-step scale from "Strongly Agree" to "Strongly Disagree" that the media demonstrates successful performance of the challenge).

Many methods of determining whether voting has met a threshold are suitable. In various embodiments, a threshold is suitably determined, for example, by reaching a pre-determined number of votes total, reaching a pre-determined number of votes indicating affirmative performance of the challenge, reaching a pre-determined percentage of votes indicating affirmative performance of the challenge, and the like.

Referring to FIG. 5, in a particular embodiment, a dare campaign detail display provides information on a dare campaign targeted to any user and includes a visual indicator that the dare campaign is in the voting phase, wherein media has been uploaded and user's optionally vote on whether the media adequately demonstrates performance of the challenge associated with the dare campaign. In this embodiment, the dare campaign detail display also provides a "Vote Now" button that allows users to access the uploaded media and cast their vote.

Pledging

In some embodiments, the platforms, systems, media, and methods described herein include pledging, or use of the same. In further embodiments, pledging is utilized, to raise funds associated with a dare campaign, which are distributed to one or more beneficiaries when one or more pre-determined conditions are satisfied. In some embodiments, funds raised are distributed to the one or more beneficiaries if and when voting concludes and determines that uploaded media adequately demonstrates successful completion of a challenge associated with a dare campaign. In further embodiments, funds raised are distributed to the one or more beneficiaries if and when voting determines successful completion of the challenge and a goal amount is pledged. In a particular embodiment, user pledges meeting or exceeding a goal amount is a pre-requisite to activation of a challenge associated with a dare campaign. In some embodiments, a dare campaign includes a pre-determined length of time to satisfy the conditions for distributions of funds raised, which is configured by the creator of the dare campaign. In some embodiments, the platforms, systems, media, and methods described herein include a software module configured to allow pledging, or use of the same.

Referring to FIG. 4, in a particular embodiment, a dare campaign summary display provides the number of users pledging (e.g., backers, etc.), a total amount pledged, a goal amount for the funds raised, and a time left for users to make a pledge. In this embodiment, the dare campaign summary display also includes a visual indicator that the dare campaign is in the pledging phase and a button allowing users to access an interface for making a pledge.

Referring to FIG. 5, in a particular embodiment, a dare campaign detail display provides the number of users pledging (e.g., backers, etc.), a total amount pledged, a goal amount for the funds raised, and a time left for users to make a pledge. In this embodiment, the dare campaign detail display also includes a visual indicator that the dare campaign has progressed past the pledging phase and is in the voting phase.

Figure 13:
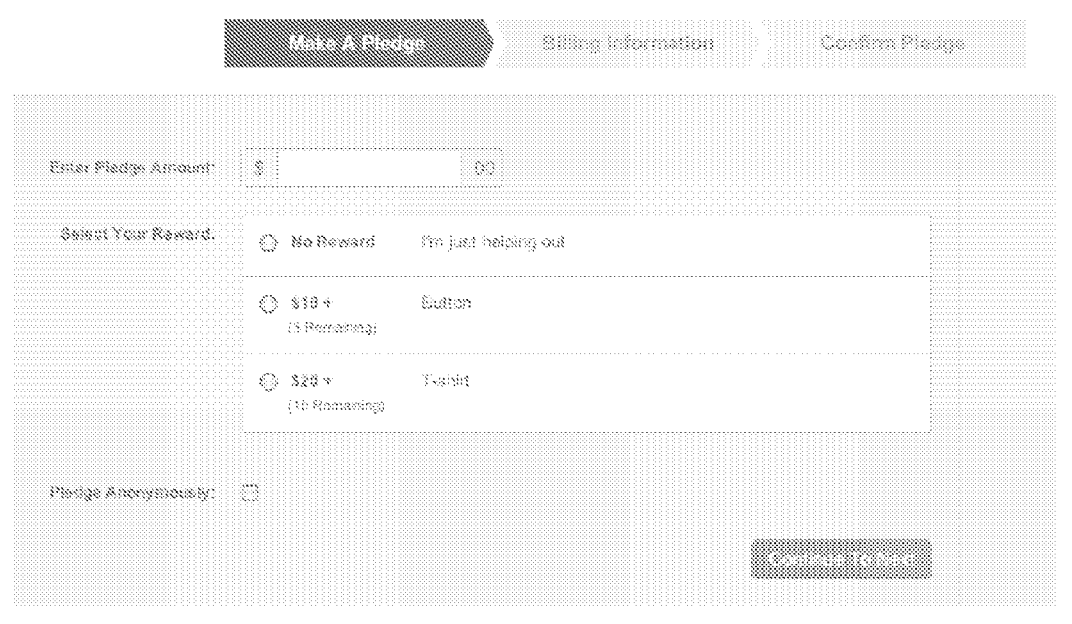

Referring to FIG. 13, in a particular embodiment, a dare pledging interface allows a user to pledge funds in a dare campaign. In this embodiment, the dare pledging interface includes features allowing a user to enter a pledge amount, selects an available reward associated with the dare (or optionally no reward), and optionally make the pledge anonymous. Further in this embodiment, if the user does not opt to make the pledge anonymous, the pledge will be linked to the user's profile.

Rewards

In some embodiments, the platforms, systems, media, and methods described herein include rewards, or use of the same. In further embodiments, rewards are utilized, to encourage pledges of funds to a dare campaign. In some embodiments, the platforms, systems, media, and methods described herein include a software module configured to allow a creator of a dare campaign to offer rewards to pledging users, or use of the same.

Figure 8:
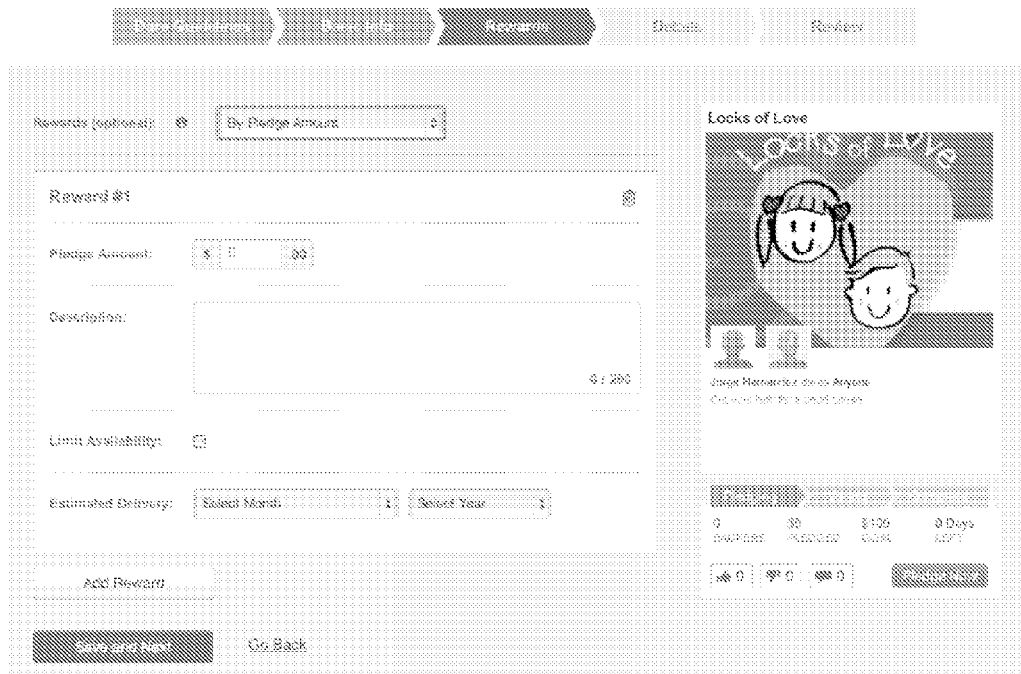
FIG. 8 shows a non-limiting example of a dare campaign creation interface; in this case, an interface allowing a user to input reward information for rewards granted to pledging users by pledge amount.

Referring to FIG. 8, in a particular embodiment, a dare campaign creation interface offers features for a dare campaign creator to optionally configure rewards by pledge amount. In this embodiment, a dare campaign creation interface allows configuration of one or more rewards. For each reward the dare campaign creator indicates a pledge amount qualifying for the reward, a description of the reward, and an estimated delivery date for the reward. Further in this embodiment, the dare campaign creator optionally limits the availability of the reward.

Figure 9:
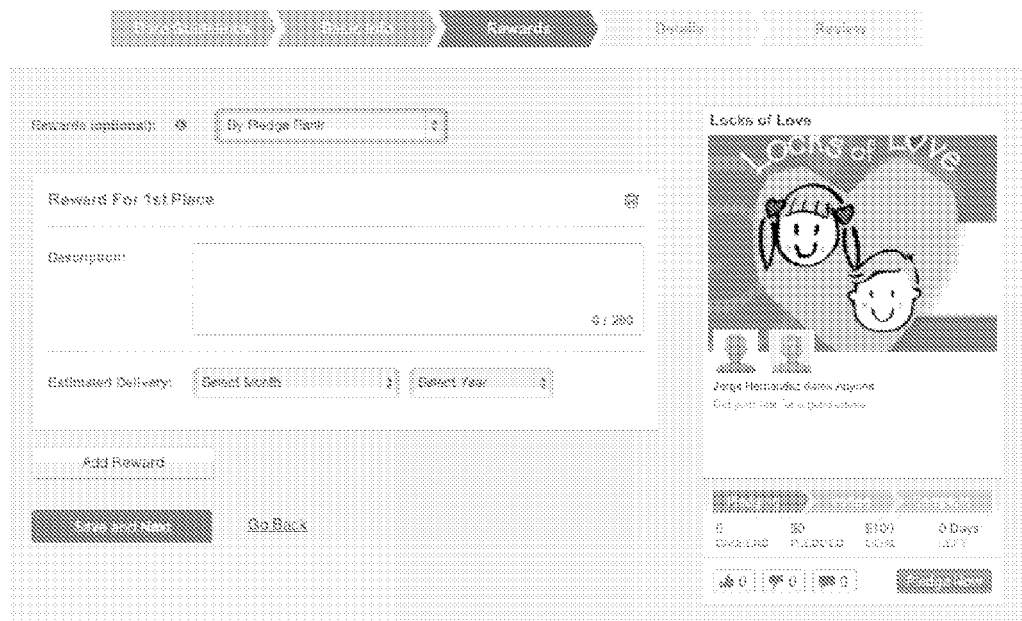
FIG. 9 shows a non-limiting example of a dare campaign creation interface; in this case, an interface allowing a user to input reward information for rewards granted to pledging users by pledge rank.

Referring to FIG. 9, in a particular embodiment, a dare campaign creation interface offers features for a dare campaign creator to optionally configure rewards by pledge rank. In this embodiment, a dare campaign creation interface allows configuration of one or more rewards. For each reward the dare campaign creator indicates a pledge rank qualifying for the reward, a description of the reward, and an estimated delivery date for the reward.

Referring to FIG. 13, in a particular embodiment, a dare pledging interface allows a user to pledge funds in a dare campaign. In this embodiment, the dare campaign creator has configured two rewards and the dare pledging interface allows a qualifying user to select from either reward or no reward.

Figure 15:
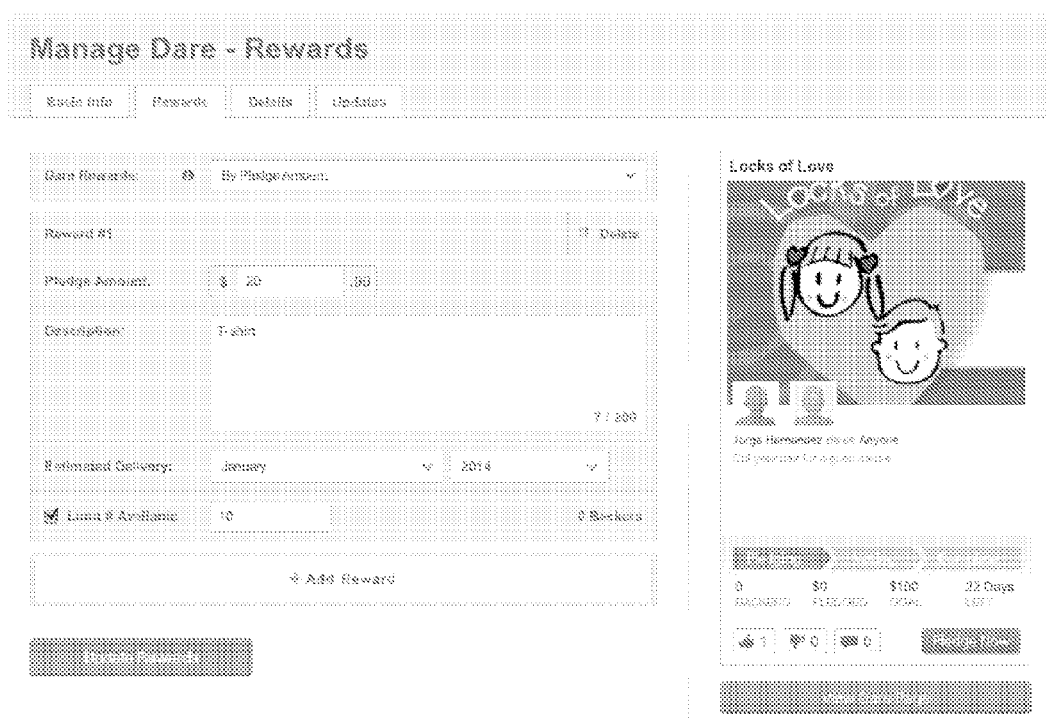
FIG. 15 shows a non-limiting example of a dare campaign management interface; in this case, a dare campaign management interface allowing a user to adjust dare reward information.

Referring to FIG. 15, in a particular embodiment, a dare campaign management interface offers features allowing a care campaign creator to edit dare reward information and/or add new rewards to a dare campaign.

Dare Campaign Community

In some embodiments, the platforms, systems, media, and methods described herein include dare campaign communities, or use of the same. In further embodiments, a dare campaign community includes a primary dare campaign. In still further embodiments, a dare campaign community includes a plurality of secondary dare campaigns. In some cases, the secondary dare campaigns are associated with a primary dare campaign based on one or more challenges suggested by community members. In other cases, the secondary dare campaigns are associated with a primary dare campaign based on a parent-child relationship. In yet other cases, the secondary dare campaigns are associated with a primary dare campaign based on a parent-clone relationship.

Any reasonable number of secondary dare campaigns is suitable. In various embodiments, dare campaign community includes a primary dare campaign and, for example, about 1, 2, 3, 4, 5, 6, 7, 8, 9, 10 or more secondary dare campaigns. In further various embodiments, dare campaign community includes a primary dare campaign and, for example, about 10, 20, 30, 40, 50, 60, 70, 80, 90, 100 or more secondary dare campaigns. In further various embodiments, dare campaign community includes a primary dare campaign and, for example, about 100, 200, 300, 400, 500, 600, 700, 800, 900, 1000 or more secondary dare campaigns. In further various embodiments, dare campaign community includes a primary dare campaign and, for example, about 1000, 2000, 3000, 4000, 5000, 6000, 7000, 8000, 9000, 10000 or more secondary dare campaigns. In further various embodiments, dare campaign community includes a primary dare campaign and, for example, about 10000, 20000, 30000, 40000, 50000, 60000, 70000, 80000, 90000, 100000 or more secondary dare campaigns.

In some embodiments, a dare campaign community is organized around a primary dare campaign. In further embodiments, the organization is visual with the primary dare campaign presented top most or centrally. In further embodiments, the organization is hierarchical with the primary dare campaign presented highest in the hierarchy. In further embodiments, the organization is logical with the primary dare campaign presented highest in the hierarchy. See, e.g., FIG. 19.

Child Dare Campaigns

In some embodiments, the platforms, systems, media, and methods described herein include child dare campaigns, or use of the same. In further embodiments, a child dare campaign has a parent-child relationship with a primary dare campaign. For example, in some embodiments, a parent-child relationship exists where one object (e.g., an individual, a celebrity, an organization, a brand, a person of influence, etc.) takes on a dare and subsequently tells everyone to take on their own different dare. In further embodiments, the subsequently created dare campaigns are interconnected and exist within a community displayed, for example, on the same web page. In still further embodiments, all the dare campaign summaries (e.g., widgets) for this one community are displayed, for example, in the same section of a web site.

In some embodiments, a dare campaign community comprises a primary dare campaign with an influencer or celebrity target, wherein the dare campaign community comprises plurality of child dare campaigns with a creator that is a fan of the influencer or celebrity. In further embodiments, a dare campaign community comprises a hierarchical user interface, wherein the primary dare campaign is displayed centrally or above related child dare campaigns. In some embodiments, a child dare campaign has parameters defaulted to those of the primary dare campaign. In further embodiments, the parameters are customizable by the creator of the child dare campaign. In still further embodiments, a child dare campaign is created with a single user interaction.

Figure 19:
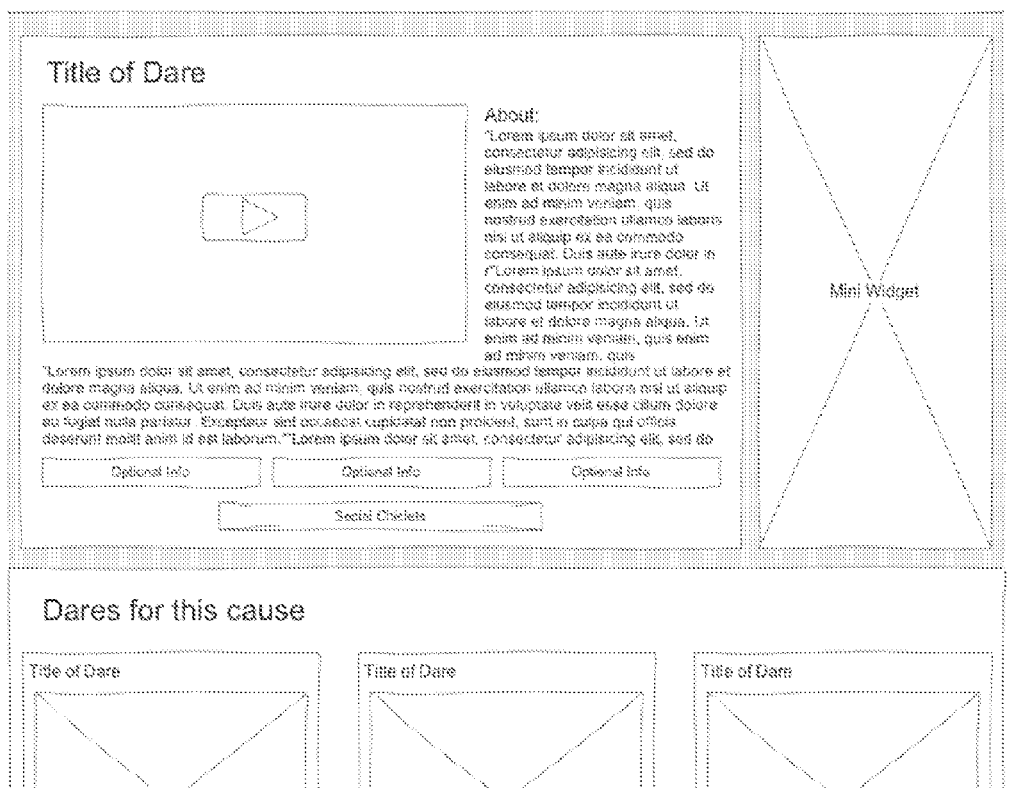
FIG. 19 shows a non-limiting example of a dare campaign community organized around a primary dare campaign; in this case, parent dare campaign is displayed at the top of a user interface and a plurality of child dare campaigns are displayed below the parent.

Referring to FIG. 19, in a particular embodiment, a dare campaign community comprises a primary dare campaign presented at the top of a dare campaign community interface. In this embodiment, the dare campaign community further comprises plurality of secondary dare campaigns presented below the primary campaign in the dare campaign community interface. In this case, each of the secondary dare campaigns is associated with the primary dare campaign by a parent-child relationship described herein.

Clone Dare Campaigns

In some embodiments, the platforms, systems, media, and methods described herein include a clone dare campaigns, or use of the same. In some embodiments, a creator of a dare optionally configures a dare to be cloneable at the time of creation or thereafter via a dare campaign management interface. In other embodiments, a creator of a dare optionally configures a dare to be non-cloneable at the time of creation or thereafter via a dare campaign management interface.

In some embodiments, a clone dare campaign has a parent-clone relationship with a primary dare campaign. By way of example, in the case of an object, what they're doing here is simply having everyone take on the same exact dare. By way of example, in some embodiments, any user can clone a dare. For example, a user creates a dare challenging his wife to cut off her hair for Locks of Love. In some cases, any other user optionally interacts with a "Clone" button to create their own dare that is the same exact dare. In further embodiments, the subsequently created dare campaigns are interconnected and exist within a community displayed, for example, on the same web page. In still further embodiments, all the dare campaign summaries (e.g., widgets) for this one community are displayed, for example, in the same section of a web site.

In some embodiments, a dare campaign community comprises a primary dare campaign with an influencer or celebrity target, wherein the dare campaign community comprises plurality of clone dare campaigns with a creator that is a fan of the influencer or celebrity. In further embodiments, a dare campaign community comprises a hierarchical user interface, wherein the primary dare campaign is displayed centrally and/or above related child dare campaigns. In some embodiments, a clone dare campaign has parameters linked to the primary dare campaign. In a particular embodiment, the linked parameters include at least the challenge. In a particular embodiment, the linked parameters include at least the beneficiary. In another embodiment, the linked parameters include at least the title and short description. In some embodiments, the linked parameters include one or more of: the title, the text description, the challenge, and the beneficiary. For example, in some embodiments, in so far as what parameters of a clone that are optionally customized, the parameters that stay the same are the title, and if it's a charitable dare the actual charity that is benefited by the funds. By way of further example, all other (e.g., non-linked) parameters are optionally customizable (e.g., editable). In some embodiments, a child dare campaign or a clone dare campaign is created with a single user interaction.

In some embodiments, any dare campaign is optionally cloned. In further embodiments, a dare campaign summary or detail interface includes a "Clone" button allowing a user to access dare campaign cloning functionality. In such embodiments, a dare campaign summary or detail interface further includes a "Clones" tab allowing a user to review all the clones associated with the dare campaign. In some embodiments, a dare campaign community includes interface elements indicating the total number of clones associated with the community. In some embodiments, a dare campaign community includes interface elements indicating the total funds raised across the dare campaigns associated with the community.

Challenges Defined by Community Members

In some embodiments, the platforms, systems, media, and methods described herein include challenges defined by community members, or use of the same. For example, in a some embodiments, a celebrity, brand, or person of influence, (e.g., the object), creates a dare campaign in a similar manner to the "create a dare" functionality described herein, but in it they specify that they're looking for other users to suggest a dare (e.g., the specific challenge to be performed) for the object to either take on or, in the event of a brand, looking for a dare to sponsor. In further embodiments, the creator optionally sets a limitation on the amount of time available for users to submit dares or to vote on submitted dares.

In embodiments where a dare campaign includes a challenge defined by community members, the dare campaign summary or detail interface indicates a "suggestion" phase in additional to other potential phases such as "pledging," "voting,", "complete," or "published," and the like. In such embodiments, the dare campaign summary or detail interface includes an "Add Suggestion" button allowing an authorized user to access the "suggest a dare" functionality described herein. In further embodiments, users optionally comment on suggested dares.

In some embodiments, a creator of a dare campaign optionally allows any user to suggest a challenge for the campaign. In other embodiments, a creator of a dare campaign optionally allows a limited group of users to suggest a challenge for the campaign. In further embodiments, suggestions are allowed from a fan base, a social circle, a defined community, or the like.

In some embodiments, users submit challenges, other users can comment and vote, and the object can submit updates (text and video) during the campaign to comment on the suggestions. In various embodiments, once the period to suggest a challenge is closed, final selection of the challenge proceeds by one of several mechanisms. For example, in some embodiments, the object picks a suggested challenge based on a wide array of parameters. In further embodiments, the object optionally just picks their favorite. In still further embodiments, the object optionally picks the challenge receiving the highest number of votes. In still further embodiments, the object optionally picks from the top challenges as determined by number of votes (e.g., selects from among the top 3, 4, 5, 6, 7, 8, 9, 10, 11, 12, 13, 14, 15, 16, 17, 18, 19, 20 or more challenges).

In some embodiments, the object optionally picks a plurality of challenges suggested. In further embodiments, the object optionally selects 2, 3, 4, 5, 6, 7, 8, 9, 10 or more of the challenges suggested. In various embodiments, once the period to suggest a challenge is closed, final selection of the challenge from the plurality of challenges proceeds by one of several mechanisms. By way of example, in some embodiments, the selected challenges are subjected to a second round of voting. By way of further example, in some embodiments, a final challenge is determined by the amount of funds raised (e.g., user pledges). In such embodiments, the final challenge is selected to maximize donations.

In some embodiments, once the final selection of a challenge is complete, anyone that has interacted within that campaign is then associated with the actual dare campaign to form a community.

In various embodiments, the object optionally decides to take on the dare on their own, turn it into a clone dare, i.e., telling their fans, "this is what I'm going to do and I want you to do this same dare in your own community," or turn it into a parent child, i.e., telling their fans "this is the dare I'm doing, you do your own unique dare in your own community." In such embodiments, the associated dares all exist within the same community established by the celebrity or influencer. If it's a brand then the only difference is that the brand may offer a big incentive just to get people to take on the dare as opposed to the brand taking on the dare which really isn't possible.

Digital Processing Device

In some embodiments, the platforms, systems, media, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB.NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, sub-notebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of dare, creator, target, challenge, beneficiary, goal, and funds raised information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. Non-transitory computer-readable storage media encoded with a computer program including instructions executable by a processor to create an application comprising:
 a. a software module configured to allow generation of a dare campaign, a dare campaign having parameters comprising a creator, a target, a challenge, a goal, funds raised, and a beneficiary, the challenge activated when the goal is reached; and
 b. a software module configured to generate a dare campaign community, a dare campaign community organized around a primary dare campaign and characterized by one or more of:
  i. a primary dare campaign having a challenge defined by a community member other than the creator or the target;
  ii. one or more child dare campaigns, wherein a child dare campaign has parameters defaulted to those of the primary dare campaign, wherein the parameters are customizable by the creator of the child dare campaign; and
  iii. one or more clone dare campaigns, wherein a clone dare campaign has parameters linked to the primary dare campaign, wherein the linked parameters include at least the challenge.

2. The media of claim 1, wherein a dare campaign further comprises parameters comprising a length of time to reach the goal or a length of time to complete the challenge.

3. The media of claim 1, wherein the software module configured to allow generation of a dare campaign provides a display indicating the current phase of the dare campaign.

4. The media of claim 1, wherein the application further comprises a software module configured to allow submission of media, the media documenting performance of the challenge by the target.

5. The media of claim 4, wherein the application further comprises a software module configured to allow voting on the media, the funds raised provided to the beneficiary when the voting reaches a threshold.

6. The media of claim 5, wherein the threshold is determined by a number of votes or a percentage of votes indicating affirmative performance of the challenge.

7. The media of claim 5, wherein a dare campaign further comprises a length of time to reach the voting threshold.

8. The media of claim 1, wherein the application further comprises a software module configured to allow pledging, a pledge contributing funds raised toward the goal.

9. The media of claim 1, wherein the target is a person.

10. The media of claim 9, wherein the person is an influencer or celebrity.

11. The media of claim 1, wherein the target is a group or organization.

12. The media of claim 1, wherein the beneficiary comprises the target.

13. The media of claim 1, wherein the beneficiary comprises a charity.

14. The media of claim 1, wherein a dare campaign community comprises a hierarchical user interface, wherein the primary dare campaign is displayed above related child and clone dare campaigns.

15. The media of claim 1, wherein a dare campaign community comprises a primary dare campaign with an influencer or celebrity target, wherein the dare campaign community comprises plurality of child dare campaigns with a creator that is a fan of the influencer or celebrity.

16. The media of claim 1, wherein a dare campaign community comprises a primary dare campaign with an influencer or celebrity target, wherein the dare campaign community comprises plurality of clone dare campaigns with a creator that is a fan of the influencer or celebrity.

17. Non-transitory computer-readable storage media encoded with a dare campaign community; the community comprising a plurality of dare campaigns, each dare campaign having parameters comprising a creator, a target, a challenge, a goal, funds raised, and a beneficiary, the challenge activated when the goal is reached; the community organized around a primary dare campaign and characterized by one or more of:
   a. a primary dare campaign having a challenge defined by a community member other than the creator or the target;
   b. one or more child dare campaigns, wherein a child dare campaign has parameters defaulted to those of the primary dare campaign, wherein the parameters are customizable by the creator of the child dare campaign; and
   c. one or more clone dare campaigns, wherein a clone dare campaign has parameters linked to the primary dare campaign, wherein the linked parameters include at least the challenge.

18. The media of claim 17, wherein each dare campaign further comprises parameters comprising a length of time to reach the goal or a length of time to complete the challenge.

19. The media of claim 17, wherein each dare campaign comprises an interface configured to allow submission of media, the media documenting performance of the challenge by the target.

20. The media of claim 19, wherein each dare campaign comprises an interface configured to allow voting on the media, the funds raised provided to the beneficiary when the voting reaches a threshold.

21. The media of claim 20, wherein the threshold is determined by a number of votes or a percentage of votes indicating affirmative performance of the challenge.

22. The media of claim 17, wherein each dare campaign comprises an interface configured to allow pledging, a pledge contributing funds raised toward the goal.

23. The media of claim 17, wherein the dare campaign community comprises a hierarchical user interface, wherein the primary dare campaign is displayed above related child and clone dare campaigns.

24. The media of claim 17, wherein the dare campaign community comprises a primary dare campaign with an influencer or celebrity target, wherein the dare campaign community comprises plurality of child dare campaigns with a creator that is a fan of the influencer or celebrity.

25. The media of claim 17, wherein the dare campaign community comprises a primary dare campaign with an influencer or celebrity target, wherein the dare campaign community comprises plurality of clone dare campaigns with a creator that is a fan of the influencer or celebrity.

26. The media of claim 17, wherein the primary dare campaign has a challenge selected by the target or selected by voting.

27. The media of claim 17, wherein the dare campaign provides a display indicating the current phase of the dare campaign.

28. The media of claim 17, wherein a child dare campaign or a clone dare campaign is created with a single user interaction.

29. A computer-implemented method of fund raising comprising:
   a. associating, by a computer, a primary dare campaign with one or more clone dare campaigns to form a dare campaign community; each dare campaign having parameters comprising: a creator, a target, a challenge, a fund raising goal, funds raised, and a beneficiary; wherein each clone dare campaign shares the beneficiary of the primary dare campaign; and
   b. presenting, by the computer, a user interface, wherein the interface presents the dare campaigns organized to represent the association between the primary dare campaign and the or more clone dare campaigns;
   c. collecting, by the computer, pledges from users in one or more of the dare campaigns, the pledges comprising funds raised; wherein the challenge is activated when the funds raised reach the fund raising goal; wherein at least a portion of the funds raised are distributed to the beneficiary upon successful completion of the activated challenge by the target.

30. The method of claim 29, wherein the target is a celebrity or influential individual or group and the beneficiary is a charitable organization.

* * * * *